UNITED STATES PATENT OFFICE.

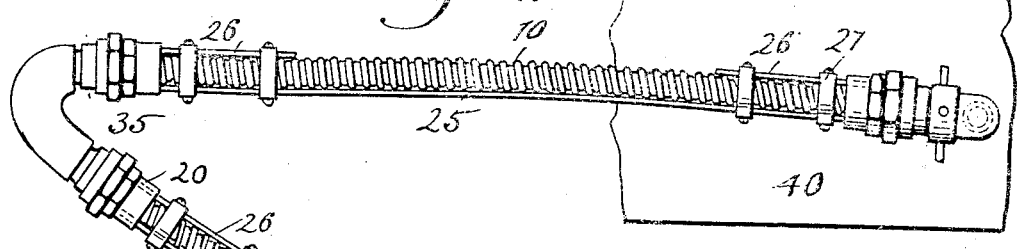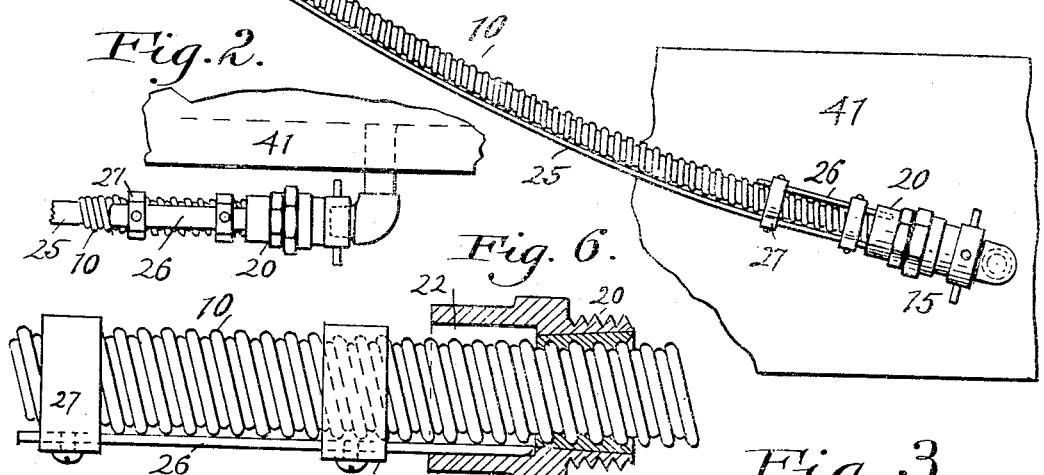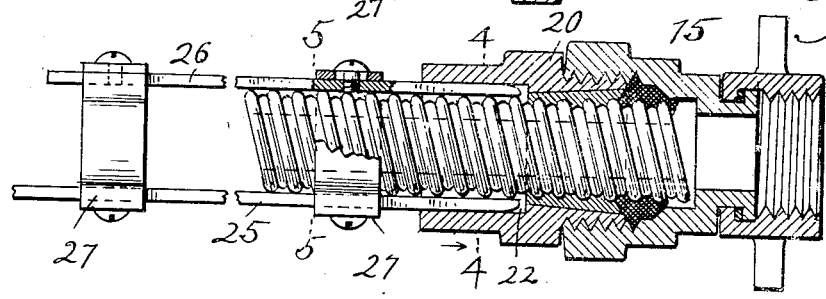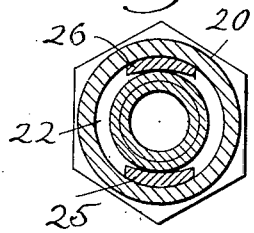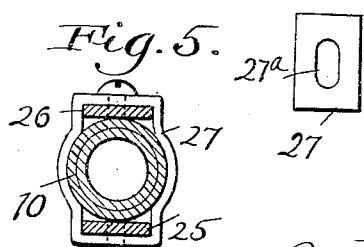

BENJAMIN H. ROSE, OF LAKEWOOD, OHIO.

REINFORCED FLEXIBLE TUBING.

1,371,981. Specification of Letters Patent. Patented Mar. 15, 1921.

Application filed September 29, 1919. Serial No. 327,031.

*To all whom it may concern:*

Be it known that I, BENJAMIN H. ROSE, a citizen of the United States, residing at Lakewood, in the county of Cuyahoga and State of Ohio, have invented a certain new and useful Improvement in Reinforced Flexible Tubing, of which the following is a full, clear, and exact description.

The primary object of this invention is to make it practical and economical to use flexible metallic tubing to convey pressure fluid from one to the other of two chambers which, in use, must be frequently moved relatively to one another.

Another object of the invention is to render it practical and economical to use flexible metallic tubing for the purpose of making a steam connection between the steam plates of a so-called hot plate press such as is used for vulcanizing rubber articles in molds which are placed between and are clamped by said plates, the hot plates being arranged one above the other, and being movable toward and from one another for the purpose of clamping and releasing said molds.

With these ends in view, the invention consists in the means substantially as shown in the drawing and hereinafter described, for so reinforcing flexible tubes as will prevent any localized bending thereof as the parts with which they are connected are moved relatively,—all of which is hereinafter fully described and pointed out definitely in the appended claims.

In the drawing, Figure 1 is an elevation of the present invention in the form best adapted for connecting the two steam plates of a vulcanizing press; Fig. 2 is a plan view of a part of one of said plates and the adjacent end of a reinforced flexible tube connected therewith; Fig. 3 is a longitudinal sectional view of one end of the reinforced flexible tube and the coupling attached to the end of said tube; Fig. 4 is a sectional view on line 4—4 of Fig. 3; Fig. 5 is a sectional view in the plane of line 5—5 on Fig. 3; Fig. 6 is a sectional view of one end of a flexible tube to which the present invention, in its simplest form is applied. Fig. 7 is a front elevation in detail of the collar supporting member.

Referring to the parts by reference characters 10 represents a flexible tube, preferably a tube made of spirally corrugated metal.

A coupling 20 is secured to each end of this tube. The couplings shown are of known form. Each embraces an end of the tube; and there is a packed joint between the tube and coupling, of such character as will prevent the escape of pressure fluid between them. The purpose of the couplings is to provide means for attaching and detaching the flexible tube to the parts between which the pressure fluid is to be conveyed through said flexible tube. As before stated, the couplings shown are of known form and the means which they embody for making the packed joint around the hose is also known. Any other form of coupling and packing may be used. In fact, a flexible metal tube having the particular couplings shown, attached to its ends, by precisely the means shown for that purpose, have long been known. When, however, such a tube is used, connected at its ends with two relatively movable parts, the tube will be bent every time there is a movement of one coupling relative to the other; and this bending almost inevitably takes place close to the coupling whereby the tubes crack and bend close to the coupling. Not all of the bending takes place close to the coupling, of course, but such additional bending as takes place is very apt to become localized, and to be greater in one place than in another; namely, at some weak place in the tube. When this action takes place the tube is apt to crack and break at this place of local bending. The chief object of the present invention is to prevent localizing of the bending of the tube; and to effect this result, flexible reinforcing means are provided for each tube.

In its best and most complete form the means consists of a flat spring bar 25, which extends from one end coupling to the other, and at its ends is supported to said coupling. This spring is disposed preferably below the tube; and is in supporting relation thereto from end to end. In the particular construction shown there is an annular recess 22 between the inner end of the coupling and the tube which is secured in said coupling. These annular recesses are utilized, in the construction shown, for making the necessary connection between the ends of the spring bar and the couplings. To effect this result the ends of the spring are crowded into the annular recesses 22 in the two couplings; and the ends of the spring are fashioned so as to fit so tightly in said recess that it is not liable to be displaced but so that, nevertheless, the spring may at one end or the other (preferably both) slide endwise in this coupling as the spring and tube are bent in use.

A short flat spring bar 26 is shown associated with each coupling. It is parallel with the spring bar 25 and is placed diametrically opposite it; and one of its ends is crowded into the same recess 22 between the tube and coupling. One or more collars 27 embraces the tube and these two springs; each collar being secured to the springs, thereby holding them in fixed relationship and holding the tube in proper position with respect to the springs.

The two springs 25, 26 will prevent any appreciable bending of the tube adjacent its joints with a coupling, and will insure that substantially all of the bending of the tube, as the two couplings are moved relatively, will take place between the adjacent ends of the two short springs 26 associated respectively with the two couplings. The long spring 25 will also support the tube throughout its length, and practically compel the tube to bend as the spring bends; that is to say, it will prevent any excessive local bending of the tube at a weak point therein.

While the long spring 25, and the two short springs 26 make the best reinforcement for the flexible tubes, nevertheless good results will be secured by using a single short spring supported by each coupling and connected by one or more collars with the tube, substantially as shown in Fig. 6. When this construction is employed the short spring should preferably be disposed beneath the tube so as to support the weight thereof close to the coupling.

So also will good results be secured if both the short springs 26 be omitted and a single long spring be used. The long spring will in a large degree prevent localized bending of the tube adjacent the coupling, and also throughout the length of the tube.

As an economical substitute for the commonly used swing joint pipes for connecting together the plates 40, 41, of a hot plate vulcanizing press two tubes reinforced as stated may be employed. Each is provided with couplings 15, and each is combined with reinforcing springs as described. In that event a return bending pipe 35 may be employed between the ends of the two reinforced tubes. A coupling on each tube is used to connect it with this return bend pipe. In fact, these couplings may be integral parts of this return bend pipe. The best construction, however, is that which is shown, because it permits the two reinforced tubes to be easily and quickly connected with and disconnected from the return bend pipe. Attempts have heretofore been made to use a single length of flexible tubing, bent into U-form, for making the connection between the two hot plates mentioned; but this has not been practically successful, because of the frequent bending which necessarily takes place in the loop connecting the two legs thereof. And it is also objectionable because, since such a U-shaped tube has no support except at its ends, the entire U-shaped structure will sag down so that the lower leg thereof will come to form a depending pocket in which steam will condense, and thereby form a steam trap which interferes with the passage of steam through the tube from one hot plate to the other with the construction shown in Fig. 1, such a sagging down of the tubes as will permit the formation of a trap or pocket in its lower leg is not possible. Additionally, localized bending of the flexible tubing is practically prevented, because as the plates move toward and away from each other the tubes bend in substantial conformity with the bending of the reinforcing springs.

When two springs 25, 26, are used adjacent each coupling, it is necessary that the connection between the collars and one or the other of the springs be slotted because, as the spring and the flexible tube bend,— even though they bend only a little,—the points of connection between each collar and the two springs will have a relative movement, as shown in Fig. 7. One of the holes 27ª in each collar through which an attaching screw passes may be an elongated slot.

Although several modifications of the preferred construction have been referred to, other modifications are obviously possible. It is the intention that the appended claims shall include all constructions which embody the stated elements or any equivalents thereof.

Having described my invention, I claim:

1. The combination of a flexible tube, a coupling secured to each end thereof, a flexible metal bar which extends from one coupling to the other in supporting relation to the flexible tube and which at its ends engages and is supported by the couplings, one of said ends having a sliding connection with the associated coupling.

2. The combination of a flexible tube, a coupling secured to each end thereof, and a spring bar which extends from one coupling to the other in supporting relation with the tube and which at its ends engages and is supported by the couplings, one of said ends having a sliding connection with the associated coupling.

3. The combination with a flexible tube, a coupling secured to each end thereof, and a spring bar which extends from one coupling to the other in supporting relation with the tube and which at its ends engages and is supported by the couplings, two collars which respectively embrace the tube adjacent the two couplings and are secured to said spring bar.

4. The combination of a flexible tube, a coupling secured to each end thereof, and a spring bar which extends from one coupling to the other in supporting relation with the tube and which at its ends engages and is supported by the couplings, two short spring bars which are respectively secured to said couplings and are parallel with the long spring bar and are on the opposite side of the tube therefrom, and collars which embrace the tube and are connected with said springs.

5. The combination of two flexible tubes, a return bend pipe to which an end of each tube is connected, a coupling secured to the free end of each tube, and, associated with each tube, a flat spring bar which engages and is supported adjacent its ends by said return bend pipe and coupling and has a sliding engagement with one of them.

6. The combination of two flexible tubes, a return bend pipe to which an end of each tube is connected, a coupling secured to the free end of each tube, and, associated with each tube, a spring bar which engages and is supported adjacent its ends by said return bend pipe and coupling and has a sliding engagement with one of them, and collars which embrace the tube near its ends and are connected with said spring bar.

7. The combination of two flexible tubes, a return bend pipe to which an end of each tube is connected, a coupling secured to the free end of each tube, and, associated with each tube, a spring bar which engages and is supported adjacent its ends by said return bend pipe and coupling and has a sliding engagement with one of them, two short spring bars disposed in parallel relation to the associated long spring bar and on the opposite side of the tube thereof, one of said short spring bars being connected with the return bend pipe and one to the coupling on the free end of said tube.

8. The combination of two flexible tubes arranged one over the other, the lower tube being the longer, an inflexible return bend pipe to which one end of each flexible tube is secured, couplings applied to the other ends of said two flexible tubes, a flexible metal bar arranged in supporting relation to each flexible tube, each bar being connected at one end to said return bend pipe and at the other end to a coupling, one of the connections between each bar and the means which support its ends being a sliding connection.

9. The combination of two flexible tubes, a return bend pipe to which an end of each flexible tube is connected, two members, one of which is movable vertically toward and from the other, couplings secured to the free ends of both flexible tubes for connecting them respectively to said two members, a spring bar arranged in supporting relation to the lower one of said two flexible tubes and operatively connected at its ends with said return bend pipe and with the lower one of said two members, thereby preventing such sagging of the lower flexible tube between its supported ends as will form a trap or pocket therein.

10. The combination of two flexible tubes, a coupling secured to each end of both tubes, means supported by said couplings to prevent localized bending of the tubes near the couplings and to prevent such bending of the tubes between the couplings as will form a trap or pocket, and a return bend pipe to the ends of which a coupling on each tube is removably connected.

11. The combination of a flexible tube, a coupling secured to each end thereof, a flexible metal bar which extends from one coupling to the other in supporting relation to the flexible tube and which at its ends engages and is supported by the coupling,— one of said ends having a sliding connection with the associated coupling, and a collar which embraces the tube and is secured to the flexible metal bar.

In testimony whereof, I hereunto affix my signature.

BENJAMIN H. ROSE.